US012599460B1

(12) United States Patent
Lee

(10) Patent No.: US 12,599,460 B1
(45) Date of Patent: Apr. 14, 2026

(54) DEVICE FOR PLACEMENT IN INTERDENTAL RESIN FILLINGS

(71) Applicant: Patrick Hammill Lee, Sausalito, CA (US)

(72) Inventor: Patrick Hammill Lee, Sausalito, CA (US)

( * ) Notice: Subject to any disclaimer, the term of this patent is extended or adjusted under 35 U.S.C. 154(b) by 0 days.

(21) Appl. No.: 19/255,474

(22) Filed: Jun. 30, 2025

(51) Int. Cl.
A61C 5/85 (2017.01)

(52) U.S. Cl.
CPC ...................................... A61C 5/85 (2017.02)

(58) Field of Classification Search
CPC ...................................... A61C 5/85; A61C 5/88
See application file for complete search history.

(56) References Cited

U.S. PATENT DOCUMENTS

| | | | | |
|---|---|---|---|---|
| 2,782,503 A * | 2/1957 | Thompson | | A61C 5/88 |
| | | | | 433/149 |
| 3,108,377 A * | 10/1963 | Meyer | | A61C 5/88 |
| | | | | 433/39 |
| 3,795,052 A * | 3/1974 | Mowery | | A61C 5/85 |
| | | | | 433/39 |
| 7,425,130 B2 * | 9/2008 | Schaffner | | A61C 5/88 |
| | | | | 433/149 |

| | | | | |
|---|---|---|---|---|
| 8,206,151 B2 * | 6/2012 | McDonald | | A61C 5/88 |
| | | | | 433/148 |
| 11,166,786 B2 * | 11/2021 | Burton | | A61C 5/85 |
| 2004/0014006 A1 * | 1/2004 | Garrison | | A61C 5/88 |
| | | | | 433/149 |
| 2004/0248064 A1 * | 12/2004 | Rodriguez del Val | ... | A61C 5/85 |
| | | | | 433/149 |
| 2005/0272005 A1 * | 12/2005 | Schaffner | | A61C 5/88 |
| | | | | 433/149 |
| 2011/0306007 A1 * | 12/2011 | Ericson | | A61C 5/85 |
| | | | | 433/226 |
| 2012/0164597 A1 * | 6/2012 | McDonald | | A61C 5/88 |
| | | | | 433/149 |
| 2019/0183609 A1 * | 6/2019 | Yonnadam | | A61C 5/85 |

FOREIGN PATENT DOCUMENTS

| | | | | | | |
|---|---|---|---|---|---|---|
| AT | | 507886 B1 | * | 9/2010 | | A61C 5/88 |
| DE | | 3816501 A1 | * | 11/1989 | | A61C 5/85 |

* cited by examiner

*Primary Examiner* — Ralph A Lewis

(74) *Attorney, Agent, or Firm* — FisherBroyles, LLP; John K. Shimmick

(57) ABSTRACT

An insert is configured to place one or more dental fillings between a first tooth and a second tooth of a patient. The insert comprises a guide sized and shaped to fit between a first tooth and a second tooth, and an elongate body extending in a longitudinal direction. The elongate body comprises a first curved portion to shape a first filling on the first tooth, a second curved portion to shape a second filling on the second tooth and a gum engagement structure sized and shaped to engage with a gum of the patient.

17 Claims, 10 Drawing Sheets

DEVICE FOR PLACEMENT IN INTERDENTAL RESIN FILLINGS

BACKGROUND

The prior approaches to shaping fillings can be less than ideal in at least some instances. For example, the prior approaches may be more complex to use and take longer than would be ideal, for example when placing dental fillings on teeth. In some instances, the prior approaches may involve using more than one part when placing a filling on one or both sides of a space between teeth, for example.

Prior matrix systems for the application of resin fillings in interproximal spaces identified as diastemas, prepared, open/light contacts or "black triangles" may involve two or more separate components, such as metal or mylar matrix strips and a wedging device, in at least some instances. These devices may be more difficult and time consuming to place and retain than would be ideal. The prior devices can be less than ideally adaptive to tooth surfaces and may provide poor contours that are less than ideal. At least some of these devices may involve removal and re-insertion for subsequent fillings, and may not provide enough room for consistent, void-less placement of fillings of the space to be filled, in at least some instances.

The prior approaches may produce unpredictable results, including open or bulky interfaces of filling and tooth surfaces, contamination of bonding and/or filling materials prior to curing, asymmetrical fillings and/or improper filling contours and light contacts, in at least some instances. Any of these results may lead to increased vulnerability of dental tissues to staining, recurrent decay and gum disease, and/or unesthetic appearance for example.

In light of the above, it would be desirable to have improved approaches to shaping fillings.

SUMMARY

In some embodiments, an insert is configured to place one or more dental fillings between a first tooth and a second tooth of a patient. In some embodiments, the insert comprises a guide sized and shaped to fit between a first tooth and a second tooth of the plurality of teeth, and an elongate body extending in a longitudinal direction. In some embodiments, the elongate body comprises a first curved portion to shape a first filling on the first tooth, a second curved portion to shape a second filling on the second tooth and a gum engagement structure sized and shaped to engage with a gum of the patient.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
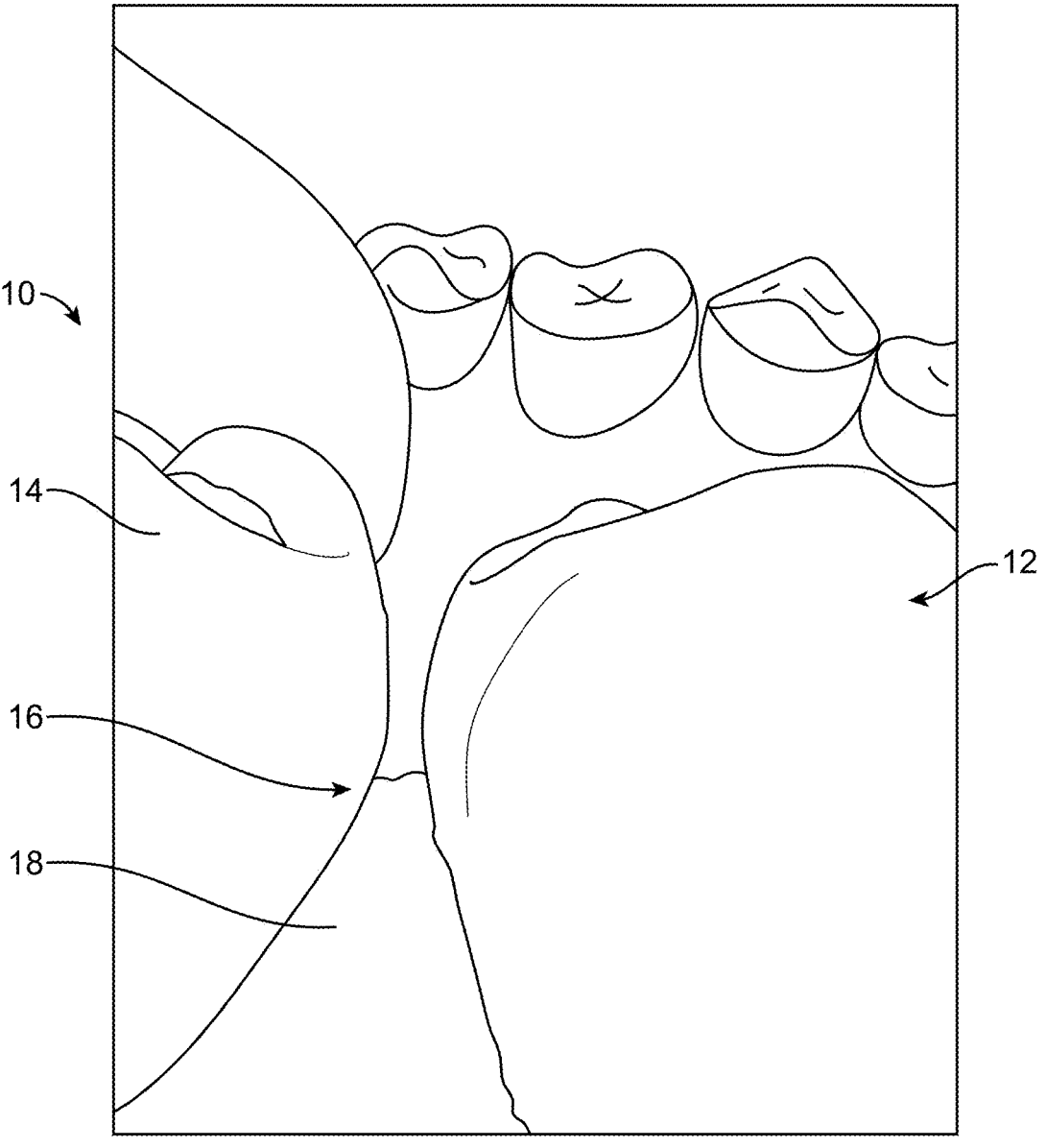
FIG. 1 shows a plurality of teeth with a diastema suitable for incorporation in accordance with some embodiments of the present disclosure.

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

In some embodiments, the presently disclosed insert device increases efficiency by allowing several devices to be used simultaneously to treat a plurality of spaces between teeth. In some embodiments, the insert device improves access to the space to be filled, provides a seal at the filling/tooth interface, natural, symmetrical contours, and tight contacts between fillings. In some embodiments, the insert device overcomes provides efficient, predictable, durable, esthetic, and precise placement of dental resin fillings in these interdental spaces, for example.

In some embodiments, a dental insert device is configured for the placement of bonded resin fillings in the spaces between teeth and these spaces may be identified as one or more of diastemas, prepared teeth, open/light contacts, or "black triangles", for example. In some embodiments, the insert device is configured to provide consistent, accurate and natural contours, an apical seal of the filling against the tooth surface, midline positional and orientational accuracy, a slight compression of the gum tissues, and a strong interproximal contact and cleanability, while improving the efficiency of placement and the predictability of results.

In some embodiments, a singular insert is placed between two adjacent teeth, whereby a dentist or otherwise licensed practitioner can more efficiently, accurately, predictably, and esthetically place bonded dental resin fillings to close spaces between teeth or restorations (diastemas, prepared teeth, open/light contacts) and spaces between adjacent teeth contact points and gums. In some embodiments, these locations comprises are referred to as black triangles. The presently disclosed is well suited to close these spaces in a simplified manner as compared with prior approaches.

In some embodiments, the insert comprises an elongate body that extends in a longitudinal direction, which may be shaped from the top bottom views, as a wedge, tapering evenly from the proximal, larger, end to a point at the distal end. In some embodiments, this shaped elongate body allows easy penetration of the device into the interproximal dental space and provides, when inserted, mild pressure on the teeth and gums in a direction away from the space being filled to compensate for the thickness of the vertical component of the device, allowing a tight contact of the fillings once the device is removed and the teeth move to their original position. The shape also provides for enough frictional resistance between the tooth surface and the device surface to keep the device wedged fully into the space and immovable during the filling process.

In some embodiments, from the side view, the shape of the horizontal component is wedge shaped from the larger, proximal end to the tip at the distal end, and is curved, about ¼ of a circle from proximal end to distal tip. This shape allows the wedge to be inserted easily and provides for the maximum amount of space for placing resin fillings and mild compression of gum tissue away from the filling.

In embodiments, the elongate body comprises, in cross section, at the proximal and distal ends, each approximately ⅕ the length of the entire wedge, a shape like a solid isosceles triangle or tetrahedron, and, in the middle approximately ⅗ of the length of the entire insert from the handle to the distal tip, may incorporate a shape like a 'whale's tail'.

In some embodiments, the elongate body may be shaped, in cross section in the middle ⅗ of the long axis of the device, with two straight arms (also referred to herein as projections) extending equally away from a midline peak at an approximately 40-60 degree internal angle, contouring away from the midline into two shallow, "U's", with a rounded base, then, further laterally, into a relatively straight line heading apically (i.e, towards the gums), to end, at the lateral extent, angling apically at an approximately 90 degree angle to the previous section In some embodiments, this shape provides, bilaterally from the vertical surface of the middle ⅗ of the wedge, a matrix for the proper apical contour of the filling away from the contact of the filling/tooth, adequate room to apply the filling material from all aspects of the space to be filled, symmetrical, equally sized shapes of fillings, an intimate, beveled contact of the filling with the tooth surfaces at the apical aspect of the space for the dental filling, and mild compression of the gums, allowing a seamless, strongly bonded, properly contoured, cleanable interface between tooth surface and filling.

In some embodiments, the longitudinal body may be shaped in cross section at the middle ⅗ of the long axis of the wedge on the apical surface (i.e., the surface facing the gums) with a midline groove running along the long axis so that the natural triangular contour of the gums between the teeth is preserved.

In some embodiments, the longitudinal body comprises a reinforcement structure to couple the longitudinal body to a handle. In some embodiments, the reinforcement structure comprises a transition from cross-sectional shape profile corresponding to the projections to a polygonal shape near the handle. In some embodiments, at a proximal portion of the longitudinal body, projections of the longitudinal body (e.g. the 'whale tail' shape) contours into a solid tetrahedron, which extends from this junction about ⅕ the length of the wedge. In some embodiments, extending proximally from the middle of the proximal surface of the tetrahedron is a ¾ circular shaped ring, embedded into the proximal end of the tetrahedron, lying horizontally, with a small hole in the middle, allowing case of insertion into and removal of the device from the interproximal space using fingers, pliers, a dental explorer, or hemostats.

In some embodiments, the plurality of projections extending from the longitudinal body comprises tips. In some embodiments, these tips extends laterally and when viewed in cross-section correspond to one or more vertices of a triangle. In some embodiments, in cross section, in the middle ⅗ of the long axis of the longitudinal body, a shallower 'whale tail' shape, much like an isosceles triangle with slight concavities on the side surfaces, to allow for better adaptation of the lateral surfaces of the horizontal component to apical surfaces of adjacent teeth.

The insert can be made of one or more of many suitable materials. In some embodiments, the longitudinal body comprises one or more of metal, resin, acrylic, vinyl, or rubber, for example. In some embodiments, the longitudinal body comprises strength and flexibility that allows adaptation to the contact surfaces bordering the space, frictional resistance to dislodgement, and structural resistance to distortion or breakage when wedged between the teeth. In some embodiments, the material properties of the surface of the insert against which resin filling will be directly placed will inhibit bonding/adhesion to the surface of the resin filling, allowing easy placement of the filling and removal of the device once the filling is cured.

In some embodiments, the lateral surface of the horizontal component of the elongate body that intimates with the tooth surface has been roughened enough to provide frictional resistance to slippage. Once fully engaged in this position, the insert device remains in position by surface friction.

In some embodiments, the insert device comprises sufficient strength to access safely, without distortion of the device or damage to the tissue, the interproximal space.

In some embodiments, the insert is available in one or more sizes. In some embodiments, the insert is provided to a health care provider in varying sizes in lengths and divergences to accommodate different teeth shapes and orientations and to accommodate different sized spaces between teeth (diastemas, prepared teeth, open/light contacts) and between teeth and gums (black triangles).

In some embodiments, the insert comprises a guide extending from the elongate body, such as a vertical component extending from the elongate body. In some embodiments, the guide is configured to shape at least a portion of the curable material that is used to fill the black triangles. In some embodiments, the guide extends in a vertical direction when the first projection and the second projection that engage the gum are placed on a level surface. In some embodiments, this guide comprises a vertical component and may appear similarly in shape to a sail on a sail boat, in which the elongate body comprises an appearance similar to a hull of the sailboat. In some embodiments, the guide extends vertically from the center of the long axis of elongate body, and a first projection and a second projection comprises edges with a wedge shape and extends towards the contact points of a first tooth and a second tooth. In some embodiments, the guide extends between the first tooth and the second tooth toward or slightly beyond the biting contact surfaces of the teeth, e.g. occlusal or incisal surfaces of the teeth.

The guide can be shaped in many ways and may be configured to treat one or more of black triangles or diastemas, for example.

In some embodiments, from a side view, guide comprises a trapezoidal shape profile with a proximally inclined distal end toward the distal end of the guide. In some embodiments, the distal tip of the insert device comprises a pointed end. In some embodiments, this configuration allows for efficient penetration of the contact area of the teeth, mimics, on the proximal and distal ends, the shape of the surfaces of the teeth, and provides sufficient working surfaces extending past all tooth surfaces to be filled.

In some embodiments, the guide is configured to treat black triangles. In some embodiments, the guide comprises a sufficient thickness and strength to allow for easy penetration, without distortion, of the contact of the teeth of the interproximal space, and of sufficient thinness to allow close midline approximation of filling material upon removal of the insert device.

In some embodiments, the guide is configured to treat one or more of diastemas, prepared teeth, or to open light contacts between teeth. In some embodiments, the guide comprises sufficient strength and thickness to maintain its shape as the teeth engaging wedge is inserted into the interdental space, of sufficient thinness and malleability to allow for proper of orientation and contour prior to filling placement, and provides for contact of the fillings at the midline between the adjacent tooth surfaces once the insert is removed and teeth move back their original position positions.

In some embodiments, the guide comprises one or more of metal, acrylic, or resin, all with a structure of the surface approximating the filling that is smooth and non-bondable to the filling material being placed in the space, for example. In some embodiments, the longitudinal body comprises one or more of these materials, for example.

In some embodiments, from the side view, the guide may extend vertically from the distal end of the reinforcement structure, e.g. a proximal tetrahedron, to slightly proximal to the distal tip of the insert device.

In some embodiments, the surfaces against which the filling is placed provide a seamless transition from the projections extending from the elongate body to the guide, in which the contours of the projections and the guide provide a substantially seamless surface against which to place and finish the filling material.

The guide can be connected to the elongate body in any suitable way. In some embodiments, the guide is one or more of attached, embedded, or secured along a middle ⅗ section in a longitudinal direction of the elongate body. Alternatively, the guide may be one or more of attached, embedded or secured to a small section of the elongate body to allow the unattached proximal and distal sections of the guide to be contoured to labial and lingual surfaces of the teeth to be filled.

In some embodiments, the insert is available to a health care provider in different sizes, and may be of varying sizes in length, thickness, and height to allow for varying sizes of the spaces to be filled.

The elongate body and the guide of the insert device may be made from a variety of materials, depending on the application. In some embodiments, the elongate body and the guide may be made of a single material, such as a plastic material or a metallic material. Alternatively, the body and guide components may be made of separate materials that integrate into a final insert device.

In some embodiments, the elongate body is manufactured by molding (e.g., injection molding) the one or more materials used to form the horizontal component. In some embodiments, the guide comprises the same material or materials as the elongate body. Alternatively, the guide may comprise a material different than the elongate body. In some embodiments, the guide has been manufactured as part of the same process (e.g., molding) used to manufacture the elongate body, integrating the elongate body and the guide into a single piece component. In some embodiments, the single piece component comprising the elongate body and the guide has been made from a single piece of material, such as a single piece formed from a flowable material such as injection molded plastic.

FIG. 1 shows a plurality of teeth 10 with a diastema 16, for example. The plurality of teeth comprises a first tooth 12 and a second tooth 14. The diastema 16 is located between the teeth and the gum 18.

Figure 2A:
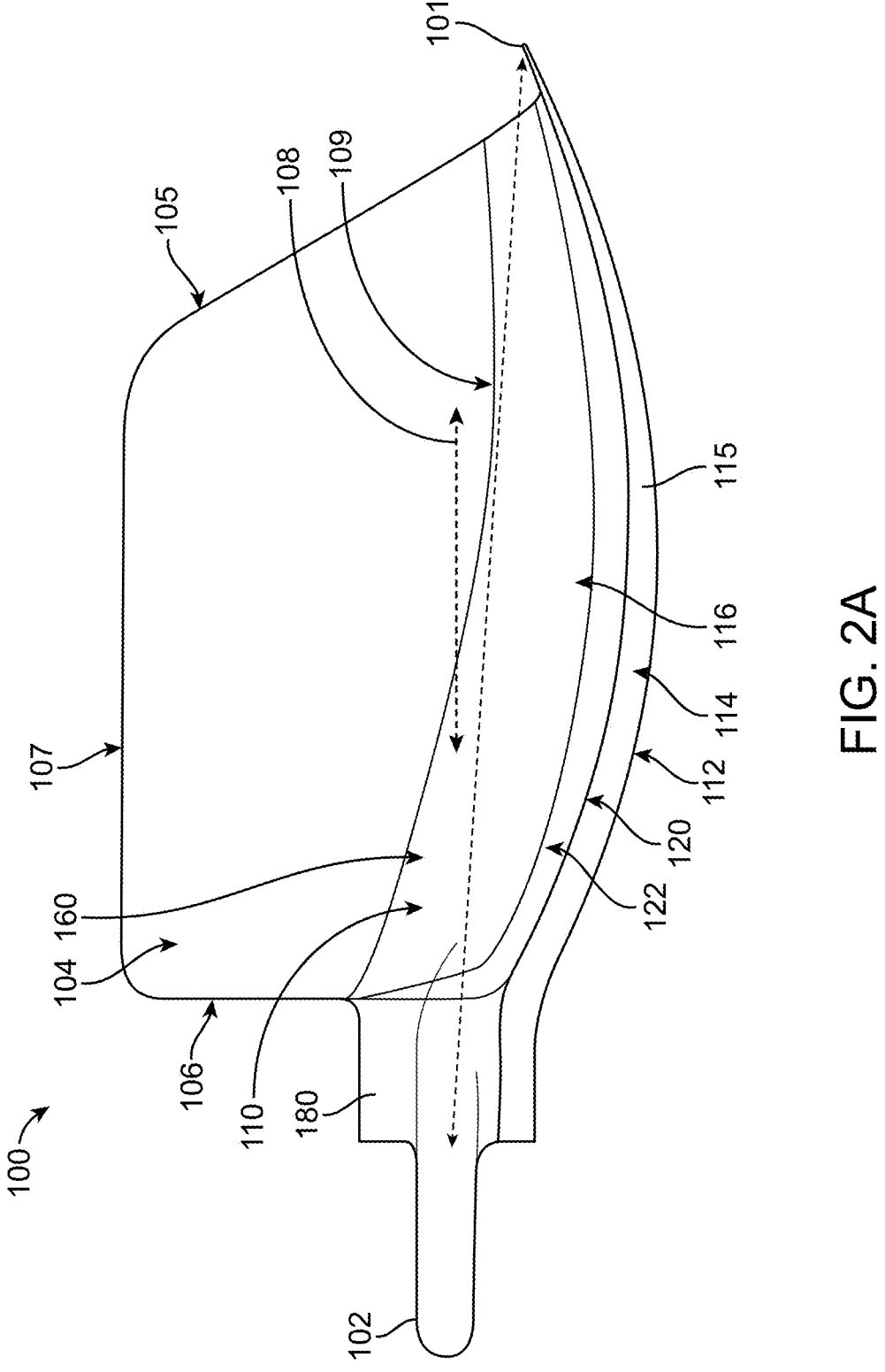
FIG. 2A shows a first side view of an insert, in accordance with some embodiments.

FIG. 2A shows a first side view of an insert 100. The insert comprises a tip 101 and a handle 102 with an elongate body 110 extending in a longitudinal direction 108. In some embodiments, the insert 100 comprises an axis 109 extending between the tip 101 and the handle 102. A 104 guide extends upwardly in an occlusal/incisal direction from the elongate body 110. In some embodiments, the guide 104 comprises an inclined distal end 105, a proximal end 106, and an occlusal end 107.

In some embodiments, the handle comprises a proximal handle and the tip comprises a distal tip. In some embodiments, the insert is placed between the teeth by advancing the insert in a proximal to distal direction. The insert 100 may comprise a reinforcement structure 180 to add strength to the insert, which can be helpful when the user advances the insert to wedge the insert between the teeth and displace the gum away from the teeth, for example.

In some embodiments, the insert 100 comprises gum engagement structure 112 and a tooth engagement structure 114 such as an edge 115. While the gum engagement structure 112 can be shaped in many ways, in some embodiments, the gum engagement structure comprises a smooth, curved surface to allow the insert to slide smoothly along the gum. While the tooth engagement structure 114 can be shaped in many ways, in some embodiments, the tooth engagement structure comprises a smooth, curved surface to slide smoothly along the tooth. Alternatively or in combination, the tooth engagement structure such as edge 115 may extend a distance in gingival-occlusal/incisal direction to decrease flow of curable material such as resin along the tooth between the tooth and the insert.

In some embodiments, the edge 115 comprises curvature extending in the longitudinal direction 108. In some embodiments, the curved edge is helpful for placing the insert between the teeth and displacing the gum away from the teeth. Although reference is made to a curved edge 115, in some embodiments the edge may comprises a substantially straight edge as seen from the side view.

In some embodiments, the insert 100 comprises a curved portion to shape a curable material, such as curved portion 116. In some embodiments, the insert extends in a laterally outward direction, which is transverse to the longitudinal axis and the curvature extends in a lateral direction. While the curved portion 116 can be shaped in many ways, in some embodiments the curved portion 116 comprises curvature in a lateral direction, such as in a cross-sectional profile as described herein. In some embodiments, the curved portion 116 comprises a first curvature in the longitudinal direction and a second curvature in the lateral direction.

In some embodiments, the insert 100 comprises a plurality of projections extending from elongate body 110, such as a first projection 120, a second projection 140 (see e.g. FIG. 1B), and a third projection 160. In some embodiments, the third projection 160 extends from elongate body 110 toward guide 104. Alternatively or in combination, the third projection 160 may comprise guide 104.

In some embodiments, the insert 100 comprises a first laterally curved concave surface 122 is configured to face a first tooth. In some embodiments, the first laterally curved surface is defined with a surface on first projection 120 and a surface on third projection 160.

Figure 2B:
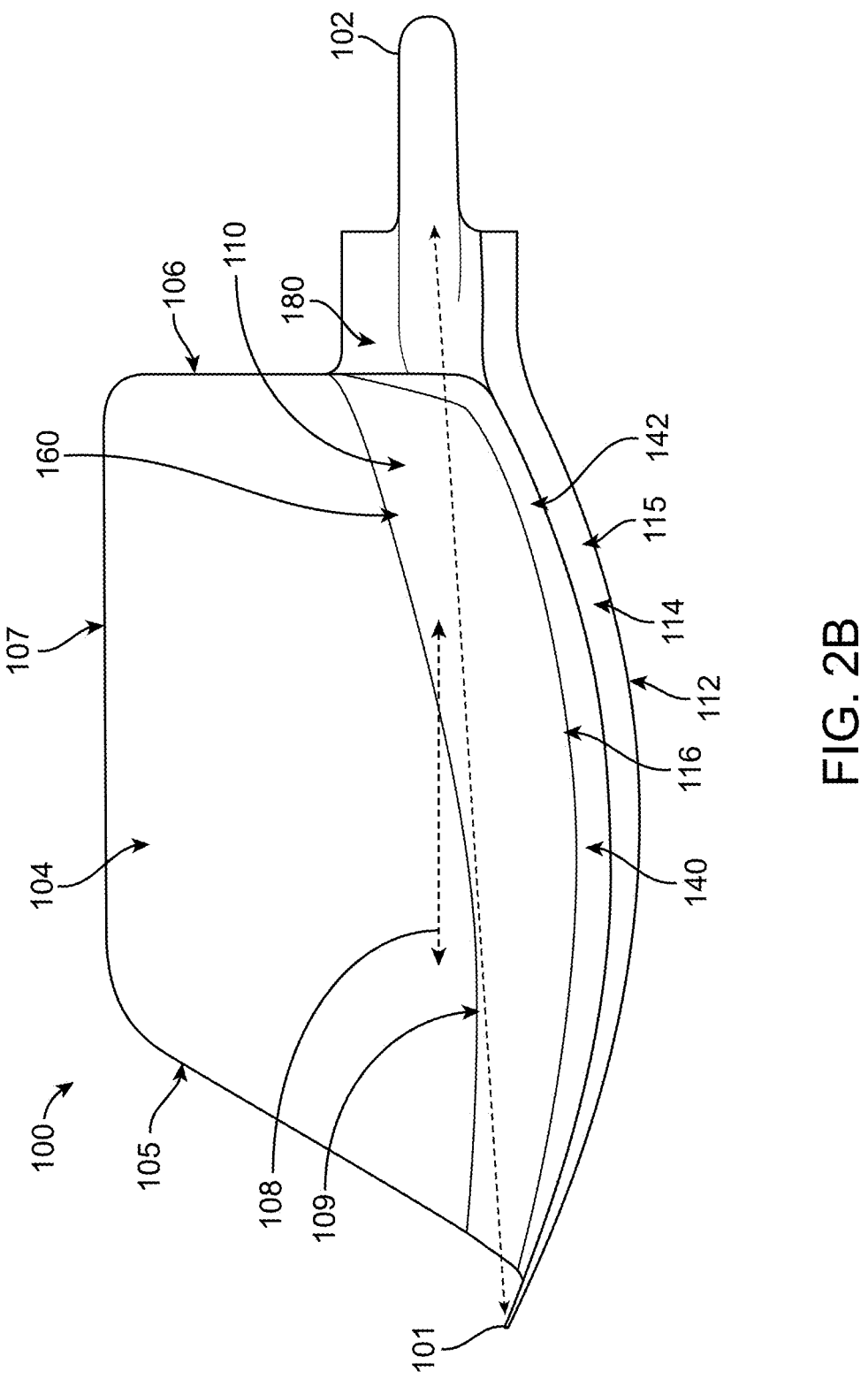
FIG. 2B shows a second side view of the insert as in FIG. 2A, in accordance with some embodiments.

FIG. 2B shows a second side view of the insert as in FIG. 2A. The second side of the insert may comprise many of the structures referred to in FIG. 2A. In some embodiments, the second side of the insert comprises a second side of the structures shown in FIG. 2A, such as a second side of one or more of the handle, guide, inclined distal end, elongate body, gum engagement structure, edge, laterally curved portion or edge, for example. In some embodiments, the second side of the insert 100 comprises a second projection 140 extending from body 110.

Figure 2D:
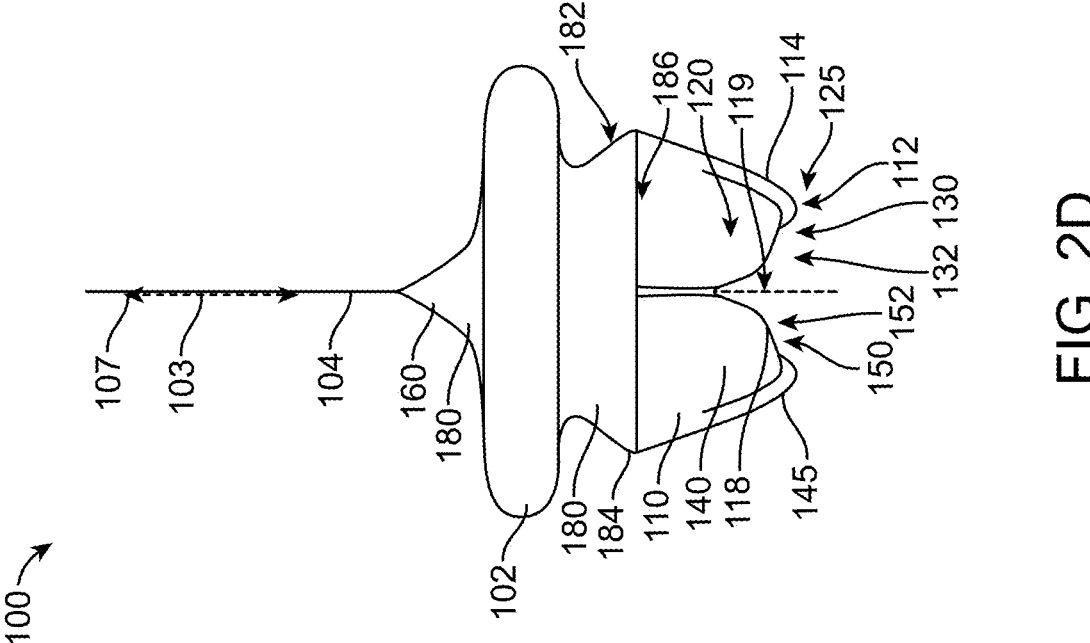
FIG. 2D shows a back view of the insert as in FIGS. 2A to 2C, in accordance with some embodiments.
Figure 2C:
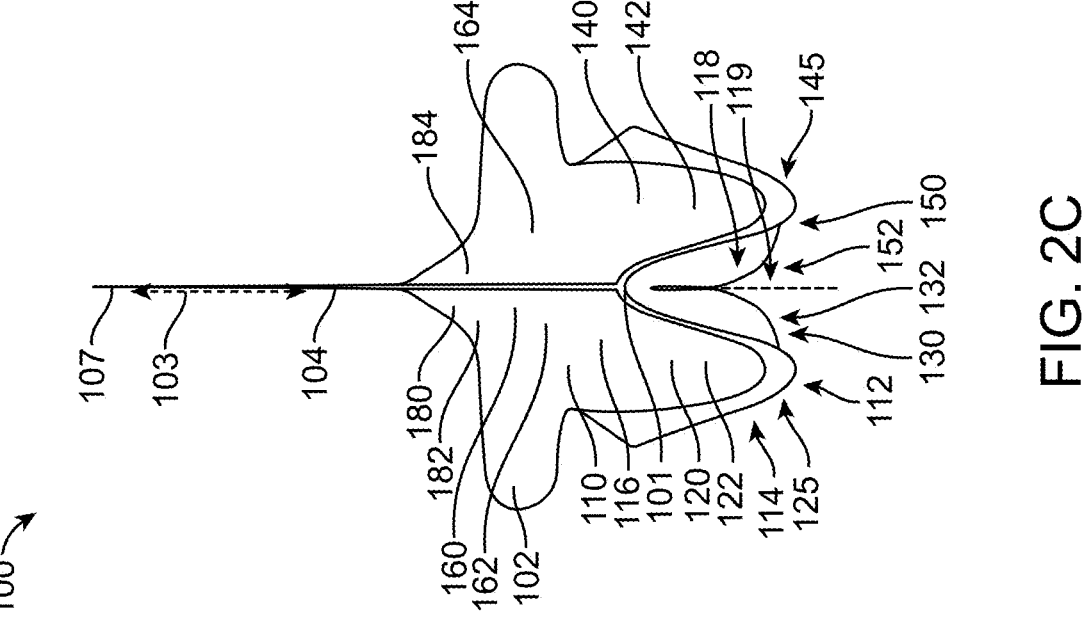
FIG. 2C shows a front view of the insert as in FIGS. 2A and 2B, in accordance with some embodiments.

FIGS. 2C and 2D and show front and back views, respectively of the insert 100. In some embodiments, the insert comprises a recess 118 to receive the gum of the patient. While the recess 118 can be shaped in many ways, in some embodiments the recess comprises structures to decrease localized stresses on the gum, such as one or more of curvature, rounded edges or bevels.

In some embodiments, insert 100 comprises a midline 103, which extends through elongate body 110. In some embodiments, the midline 103 extends along guide 104 and through longitudinal body, for example.

In some embodiments, the insert comprises a first side configured to face toward the first tooth and a second side configured to face a second tooth. In some embodiments, the first projection 120 extends to a first edge 125 on the first side. In some embodiments, the first projection 120 comprises a first laterally curved concave portion 122 on a first tooth facing side of the projection. In some embodiments, this first laterally curved concave portion 122 helps to shape the material that is cured so that the first tooth looks natural. In some embodiments, the first projection 120 comprises gum facing side 130, which defines a portion of recess 118. In some embodiments, the first projection 120 comprises a laterally curved convex portion 132 of recess 118. In some embodiments, this laterally curved convex portion 132 corresponds to the shape of the concave portion 122. This laterally curved convex portion 132 that corresponds to the shape of the concave portion 122 may help to decrease the thickness of the first projection and may provide less displacement of the gum, for example.

In some embodiments, the insert comprises a second side configured to face toward the second tooth. The second projection 140 extends to a second edge 145. In some embodiments, the second projection 140 comprises a second laterally curved concave portion 142 on a second tooth facing side of the projection. In some embodiments, this second laterally curved concave portion 142 helps to shape the material that is cured so that the second tooth looks natural. In some embodiments, the second projection 140 comprises gum facing side 150, which defines a portion of recess 118. In some embodiments, the second projection 140 comprises a laterally curved convex portion 152 of recess 118. In some embodiments, this laterally curved convex portion 152 corresponds to the shape of the concave portion 142. This laterally curved convex portion 152 that corresponds to the shape of the concave portion 142 may help to decrease the thickness of the first projection and may provide less displacement of the gum, for example.

In some embodiments, the body 110 of the insert 100 comprises a third projection 160 that extends from body 110 toward guide 104. In some embodiments, the third projection 160 extends in a longitudinal direction. In some embodiments, the third projection 160 comprises the guide 104.

In some embodiments, a portion of the first projection 110 and a portion of the third projection 160 define a portion of the first curved portion 122 to shape the first filling. In some embodiments, a portion of the second projection 140 and a portion of the third 160 projection define the second curved portion 142 to shape the second filling.

While the third projection 160 can be configured in many ways, in some embodiments a first tooth facing portion of the third projection 160 defines a medial portion of the first laterally curved portion 122 to shape the first filling, and a second tooth facing portion of the third projection defines a medial portion of the second curved portion 142 to shape the second filling. In some embodiments, the medial portion of the first laterally curved portion 122 of the third projection 160 comprises a surface profile to interface with guide 104, so as to provide a smooth transition profile from the third projection to the guide. In some embodiments, the medial portion of the second laterally curved portion 142 of the third projection 160 comprises a surface profile to interface with guide 104, so as to provide a smooth transition profile from the third projection to the guide. In some embodiments, the guide 104 comprises a transverse thickness substantially matching a transverse thickness of the of the third projection at the interface between the third projection 160 and guide 104.

In some embodiments, the guide comprises a thickness within a range from about 0.001" (inches) to about 0.003", which corresponds to a thickness of about 0.025 mm to about 0.076 mm. While the guide can be made of any suitable material, in some embodiments the guide comprises metal such as steel, e.g. stainless steel. The metal can be made of varying hardness and flexibility as will be understood by one of ordinary skill in the art, for example. Alternatively or in combination, the guide may comprise plastic.

While the reinforcement structure 180 can be configured in many ways, in some embodiments the engagement structure comprises a first side 182, a second side 184, and a third side 186. In some embodiments, the first side 182, the second side 184, and the third side 186, correspond respectively to locations between the first projection 120 and the third projection 160, the first projection 120 and the second projection 140, and the second projection 140 and the third projection 160, for example.

In some embodiments, the reinforcement structure 180 comprises a triangular cross-sectional shape profile proximate the handle, a first side 182 of the triangular shape profile corresponding to the first curved portion 122, a second side 184 of the triangular shape profile corresponding to the second curved portion 142, and a third side 186 of the triangular shape profile corresponding to the gum engagement portion of the insert between the first projection 120 and the second projection 140.

In some embodiments, the vertices of the triangular shape profile correspond to the projections. In some embodiments, the first side 182 corresponds to first projection 120 and third projection 160. In some embodiments, the second side 184 corresponds to second projection 140 and third projection 160. In some embodiments, the third side 186 corresponds to the first projection 120 and the second projection 140.

In some embodiments, the reinforcement structure comprises a shape profile that varies in the longitudinal direction between the handle and the first curved portion, the second curved portion and the gum engagement structure. In some embodiments, the shape profile transitions from the shape profile of the distal portion of the handle to the shape profile of the first curved portion, the shape profile of the second curved portion and the shape profile of the gum engagement structure. In some embodiments, the shape profile of reinforcement structure 180 transitions when viewed with a cross-sectional profile. In some embodiments, the cross-sectional shape profile of the reinforcement structure 180 transitions in accordance the shape profile of the reinforcement structure 180 at the handle to the cross-sectional shape profile of the first curved portion 122, the shape profile of the second curved portion 142 and the shape profile of the gum engagement structure 114.

In some embodiments, the recess 118 comprises a maximum depth 119 that extends along the midline as shown with the dashed line. In some embodiments the recess 118 comprises a curvature in the longitudinal direction along a portion of the body 110 located between tip 101 and handle 102. In some embodiments the maximum depth 119 of recess 118 comprises a curvature in the longitudinal direction of the recess. In some embodiments, the depth of the recess at a longitudinal location comprises a depth measured along the midline 103 that corresponds to a depth of the recess with respect to the edge of the insert, for example one or more of edge 125 or edge 145, for example.

Figure 2E:
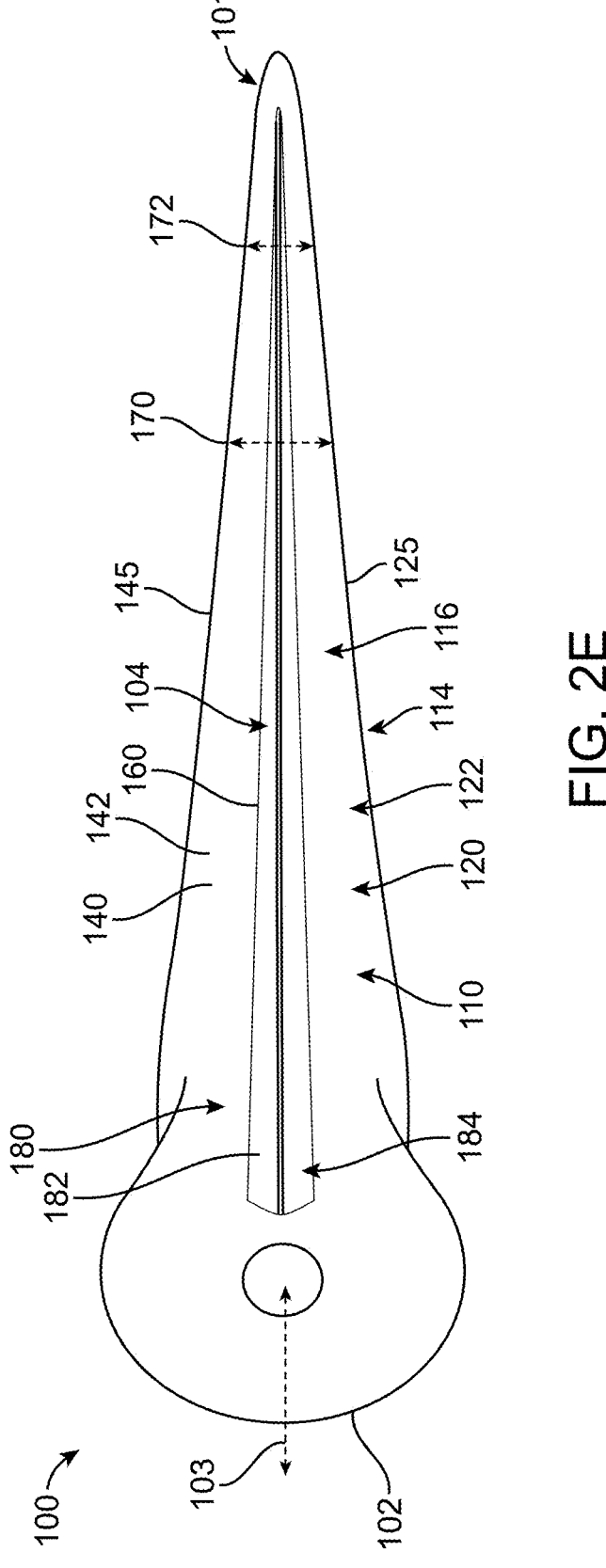
FIG. 2E shows a top view of the insert as in FIGS. 2A to 2D, in accordance with some embodiments.
Figure 2F:
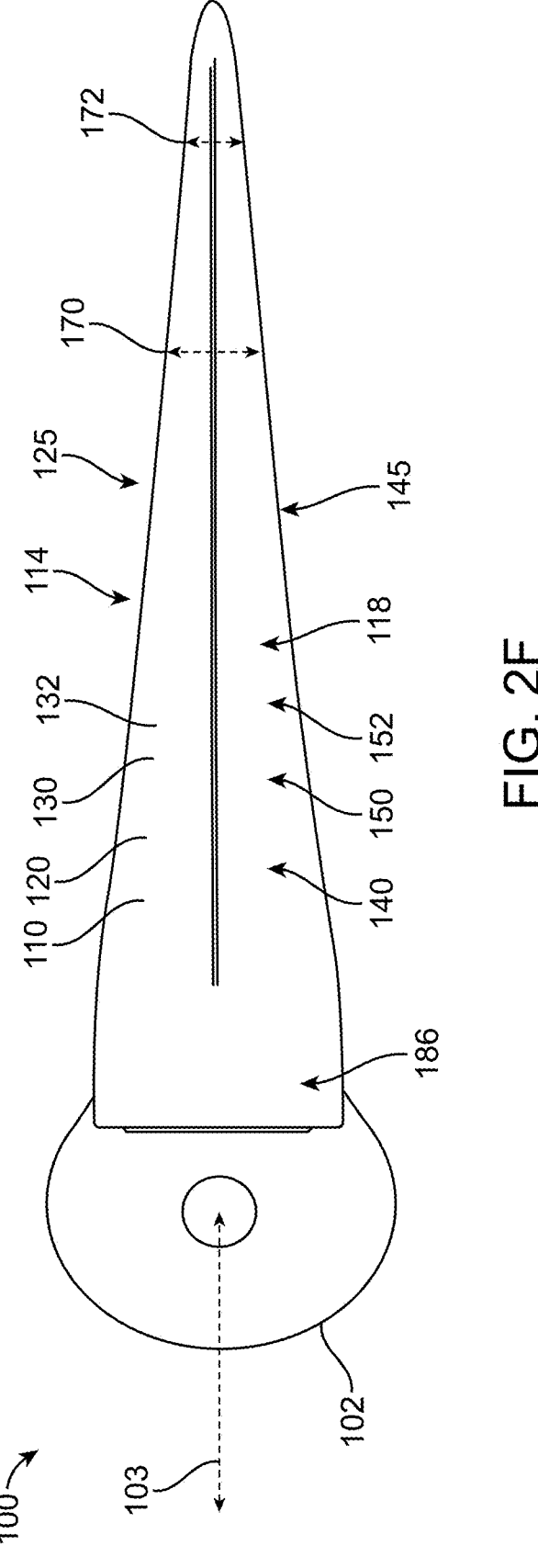
FIG. 2F shows a bottom view of the insert as in FIGS. 2A to 2E, in accordance with some embodiments.

FIGS. 2E and 2F shows a top view and a bottom view, respectively, of the insert as in FIGS. 2A to 2D. The insert may comprise many of the structures referred to in FIGS. 2A to 2D, such as one or more of the handle, guide, inclined distal end, elongate body, gum engagement structure, edge, laterally curved portion or edge, for example.

In some embodiments, the body 110 comprises a wedge shape between first edge 125 and second edge 145, for example. In some embodiments, the body 100 comprises a first width 170 at a first longitudinal location and a second width 172 at a second longitudinal location. In some embodiments, the first width 170 at the first longitudinal location is larger than the second width 172 at the second longitudinal location, for example when the first width is proximal to the second width.

In some embodiments, the recess 118 comprises a varying width along a portion of the longitudinal body. In some embodiments, the portion of the longitudinal body comprises a proximal portion toward the handle and a distal portion toward the tip, and the width increases in a proximal to distal direction along the midline of the proximal portion and the width decreases in the proximal to distal direction along the distal portion.

In some embodiments, the recess 118 extends along a portion of the longitudinal body 110 between the distal tip 101 and the proximal handle 102. In some embodiments, the recess 118 comprises a varying depth along a midline of the portion of the longitudinal body. In some embodiments, a portion of the longitudinal body 110 comprises a proximal portion toward the handle and a distal portion toward the tip, and the depth increases in a proximal to distal direction along the midline of the proximal portion, and the depth decreases in the proximal to distal direction along the distal portion.

Figure 3:
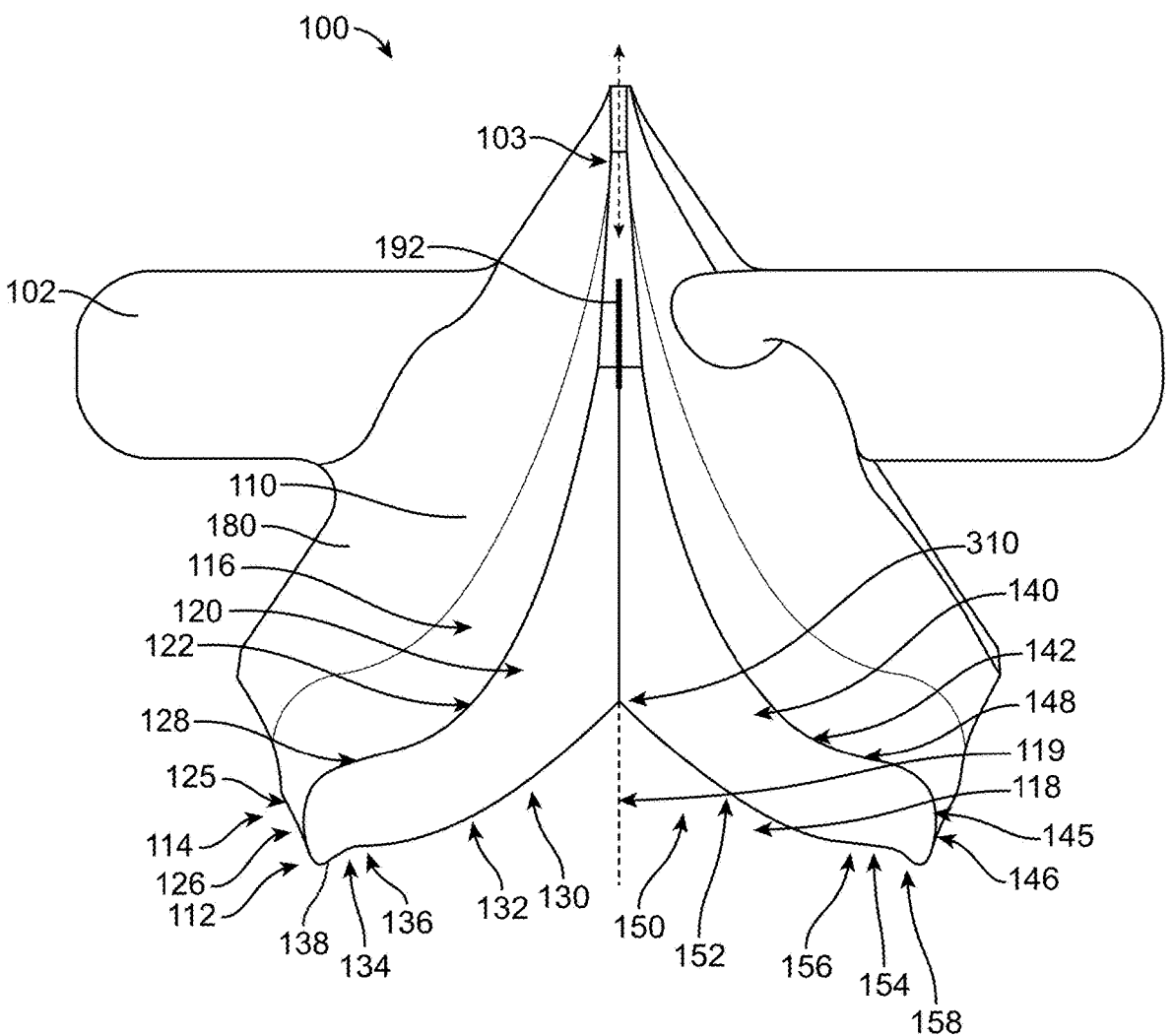
FIG. 3 shows a cross-sectional view of an insert, in accordance with some embodiments.

FIG. 3 shows a cross-sectional view of an insert 100, such as a cross-section of the insert shown in a three dimensional (3D) view. The insert may comprise any of the structures referred to in FIGS. 2A to 2F, such as one or more of the handle, guide, inclined distal end, elongate body, gum engagement structure, edge, laterally curved portion or edge, for example.

In some embodiments, the surfaces of the insert 100 comprise a plurality of concave curvatures to shape the curable material such as a resin, and one or more concave surfaces to receive the gum. In some embodiments, one or more inflections of the surface are located between a convex surface and a concave surface. In some embodiments, the inflection corresponds to a location where the surface profile transitions from a concave curvature to a convex curvature, or vice versa, for example In some embodiments, the first projection 120 comprises the first laterally curved concave portion 122 and the first edge 125 comprises a convex portion 126. In some embodiments, an inflection 128 is located between concave portion 122 and convex portion 126.

In some embodiments, a gum facing side of first projection 120 comprises a laterally curved convex portion 132. Alternatively or in combination, the gum facing side of the first projection 120 may comprise a laterally curved concave portion 134, which may be located laterally to the convex portion 132. In some embodiments, an inflection 136 is located between the convex portion 132 and the concave portion 134.

In some embodiments, the concave portion 134 comprises a recessed portion, which may help to allow the gingival most edge of the first projection 120 to seat against the gum while the edge 125 engages the tooth.

In some embodiments, the tip 125 of projection 120 comprises a convex portion 126, and an inflection 138 is located between the convex portion 126 and the concave portion 134 of the recess 118.

In some embodiments, the second projection 140 comprises the second laterally curved concave portion 142 and the second edge 145 comprises a convex portion 146. In some embodiments, an inflection 148 is located between concave portion 142 and convex portion 146. In some embodiments, the inflection corresponds to a location where the surface profile in the lateral direction transitions from a concave curvature to a convex curvature, for example.

In some embodiments, a gum facing side of second projection 140 comprises a laterally curved convex portion 152. Alternatively or in combination, the gum facing side of the second projection 140 may comprise a laterally curved concave portion 154, which may be located laterally to the convex portion 152. In some embodiments, an inflection 156 is located between the convex portion 152 and the concave portion 154.

In some embodiments, the concave portion 154 comprises a recessed portion, which may help to allow the gingival most edge of the second projection 140 to seat against the gum while the edge 145 engages the tooth.

In some embodiments, the tip 145 of projection 140 comprises a convex portion 146, and an inflection 158 is located between the convex portion 146 and the concave portion 134 of the recess 118.

In some embodiments, the first lateral projection 120 extends in the gingival direction to a first gingival edge and the second lateral projection extends in the gingival direction to a second gingival edge. In some embodiments, the first convex portion 126 of the first projection extends to the first gingival edge and second convex portion 146 extends to the second gingival edge. In some embodiments, the first gingival edge corresponds to lowest portion of the projection 120 in a cross-section, and the second gingival edge corresponds to lowest portion of the projection 140 in a cross-section.

While the gingival edges can be configured in many ways, in some embodiments, the first gingival edge comprises a first curvature in the longitudinal direction 108 and the second gingival edge comprises a second curvature in the longitudinal direction 108.

In some embodiments, the body 110 of insert 100 comprises a slot 192 sized to receive guide 104. In some embodiments, the guide 104 is inserted into slot 192 to assemble insert 100, for example. In some embodiments, the slot 192 is located along midline 103 of the body.

Figure 4:
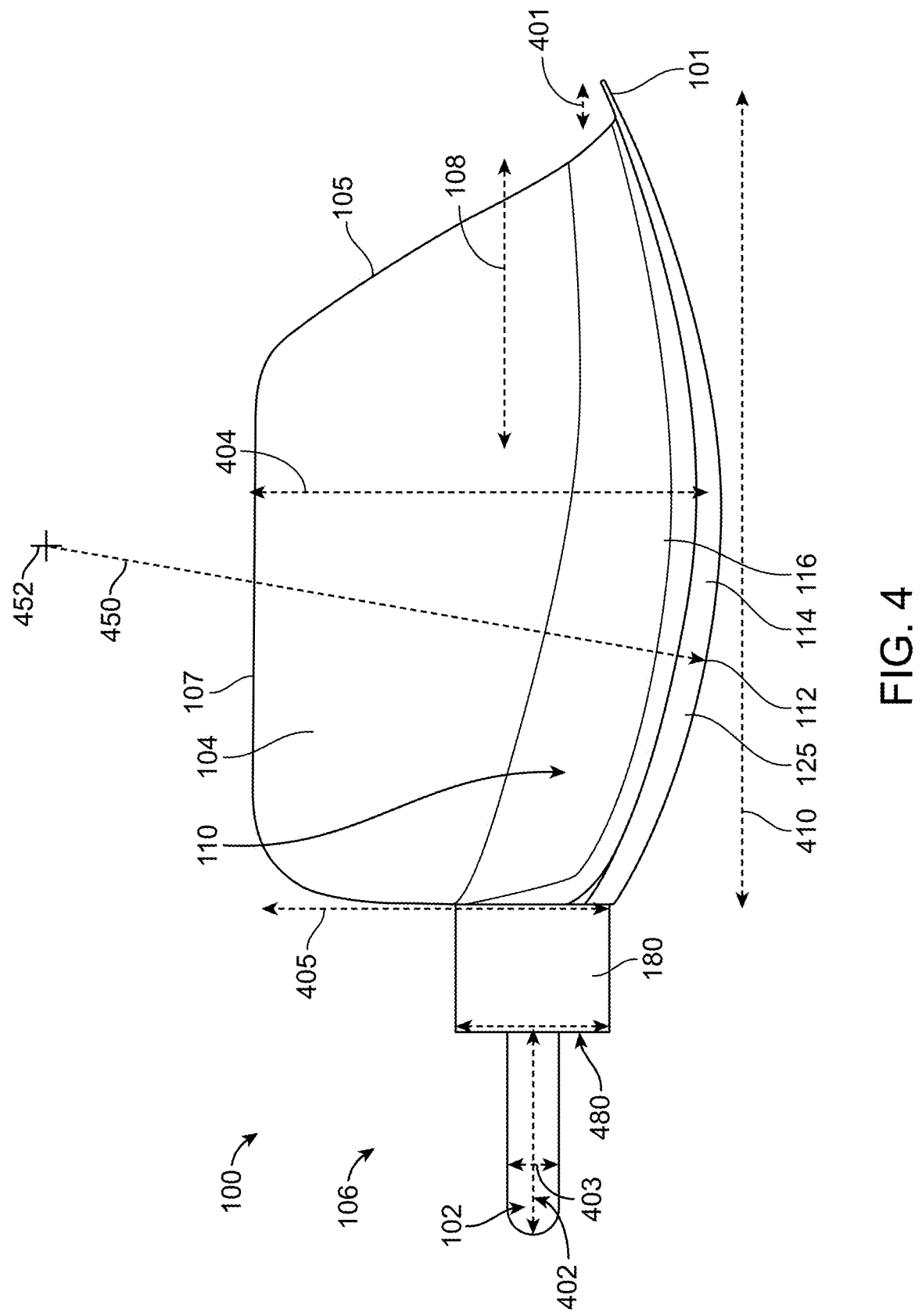
FIG. 4 shows dimensions of an insert, in accordance with some embodiments.

FIG. 4 shows dimensions of an insert 100. The dimensions may comprise one or more of a tip length 401, a handle length 402, a handle height 403, a maximum working height 404, a minimum working height 405, a working length 410 or a reinforcement height 480. In some embodiments, the tip length 401 is within a range from about 0.5 mm to about 2 mm. In some embodiments, the handle length 402 is within a range from about 2 mm to about 10 mm. In some embodiments, the handle width 403 is withing a range from about 0.5 to about 2 mm. In some embodiments, the maximum working height 404 is withing a range from about 6 mm to about 14 mm. In some embodiments, the minimum working height 405 is within a range from about 5 mm to about 9 mm. In some embodiments, the working length 410 is within a range from about 10 mm to about 22 mm. In some embodiments, the reinforcement height 480 is within a range from about 1.5 mm to about 4 mm. In some embodiments, the reinforcement structure 180 comprises a reinforcement width within a range from about 1.5 mm to about 4 mm.

In some embodiments, one or more of structures of the elongate body 110 extends in the longitudinal direction with curvature. In some embodiments, one or more of the gum engagement structure 112, the tooth engagement structure 114, the edge 115, the laterally curved portion 116, the recess 118, the maximum depth of the recess 119, the edge 115, the first projection 120 or the second projection 140 extends in the longitudinal direction with curvature. Each of these structures may extend in the longitudinal direction with a curvature corresponding to a radius of curvature. In some embodiments, the radius of curvature corresponds to a location around an axis 452. In some embodiments the axis 452 of the radius of curvature corresponding to the curvature of the insert is located above the occlusal edge 107 of guide 104.

In some embodiments, the gum engagement structure 112 extends in the longitudinal direction 108 with a curvature corresponding to a radius of curvature 450, for example.

Referring again to FIG. 3, each of the laterally extending structures of body 110 shown in FIG. 3 may vary in accordance with the width of the longitudinal body at a location along the longitudinal body. In some embodiments, these structures vary in accordance with the first width 170 at the first longitudinal location and second width 172 at the second longitudinal location. In some embodiments, these portions vary in accordance with a first portion on a first side of the insert and a second portion on a second side of the insert.

In some embodiments, wherein the first curved portion 122 comprises a first concave profile in a first lateral direction on a first side of the guide 104 and a second concave portion 142 comprises a second concave profile in a second lateral direction on a second side of the guide. In some embodiments, the first concave profile extends in the longitudinal direction and the second concave profile extends in the longitudinal direction. In some embodiments a first lateral width of the first concave profile increases in a distal to proximal longitudinal direction and a second lateral width of the second concave profile increases in the distal to proximal longitudinal direction. In some embodiments, the first concave profile comprises a first lateral width at a first longitudinal location and a second lateral width at a second longitudinal location, the first lateral width less than the second lateral width, the first longitudinal location distal to the second longitudinal location. In some embodiments, the second concave profile comprises a first lateral width at a first longitudinal location and a second lateral width at a second longitudinal location, the first lateral width less than the second lateral width, the first longitudinal location distal to the second longitudinal location. In some embodiments, a first lateral curvature of the first concave profile decreases in a distal to proximal longitudinal direction and a second lateral curvature of the second concave profile decreases in the distal to proximal longitudinal direction. In some embodiments, the first lateral curvature corresponds to a first radius of curvature and the first radius of curvature increases in a distal to proximal longitudinal direction and the second lateral curvature corresponds to a second radius of curvature and the second radius of curvature decreases in the distal to proximal longitudinal direction.

In some embodiments, one or more of the structures of the body 110 shown in the cross-sectional view FIG. 3 extend in the longitudinal direction 108 with curvature in accordance with the radius of curvature 450. In some embodiments, one or more of these structures comprise laterally extending structures in the cross-sectional view, which also extend in the longitudinal direction with the curvature substantially in accordance with the radius of curvature 450.

In some embodiments, the first lateral projection 120 extends in the longitudinal direction 108 with a first longitudinal curvature and the second lateral projection 140 extends in the longitudinal direction 108 with a second longitudinal curvature, for example on a second side of the midline. In some embodiments, the curvature on the first projection 120 substantially matches the curvature on the second projection 140.

In some embodiments, one or more structures of the first projection 120 extend in the longitudinal direction with curvature as described herein. In some embodiments the one or more structures of the first projection that extending longitudinally with curvature comprise one or more of the first laterally curved concave portion 122, the first edge 125, the convex portion 126 of the first edge 125, the inflection 128, the gum facing side 130 of the first projection, the laterally curved convex portion 132, the laterally curved concave portion 134, the inflection 136, or the inflection 138. Each of these structures may extend in the longitudinal direction with a curvature corresponding to a radius of curvature. In some embodiments, the radius of curvature corresponds to a location around an axis 452. In some embodiments the axis 452 of the radius of curvature corresponding to the curvature of the insert is located above the occlusal edge 107 of guide 104.

In some embodiments, one or more structures of the second projection 120 extend in the longitudinal direction with curvature as described herein. In some embodiments the one or more structures of the second projection that extending longitudinally with curvature comprise one or more of the second laterally curved concave portion 142, the first edge 145, the convex portion 146 of the second edge 145, the inflection 148, the gum facing side 150 of the second projection, the laterally curved convex portion 152, the laterally curved concave portion 154, the inflection 156, or the inflection 158, for example. Each of these structures may extend in the longitudinal direction with a curvature corresponding to a radius of curvature. In some embodiments, the radius of curvature corresponds to a location around an axis 452.

In some embodiments the axis 452 of the radius of curvature corresponding to the curvature of the insert is located above the occlusal edge 107 of guide 104. In some embodiments, the radius of curvature corresponds to a point such as axis 452 located beyond the guide in an occlusal/incisal direction.

In some embodiments, one or more of these structures extends in the longitudinal direction with a longitudinal curvature and extends in a lateral direction away from the midline with a lateral curvature. In some embodiments, each of these structures comprises a localized region comprising a curvature in the longitudinal direction and in the transverse direction. In other words, the localized curvature of each of the plurality of regions may comprise a transverse curvature and a lateral curvature, which approximates a toric surface, similar to an astigmatic lens. In some embodiments, each of these structures comprises a plurality of localized regions that vary in curvature at different locations. In some embodiments, these structures comprise one or more of the gum engagement structure 112, the tooth engagement structure 114, the edge 115, the laterally curved portion 116, the recess 118, the maximum depth of the recess 119, the edge 115, the first projection 120 or the second projection 140, for example.

In some embodiments, one or more structures of the second projection 140 extend in the longitudinal direction with curvature.

Figure 5:
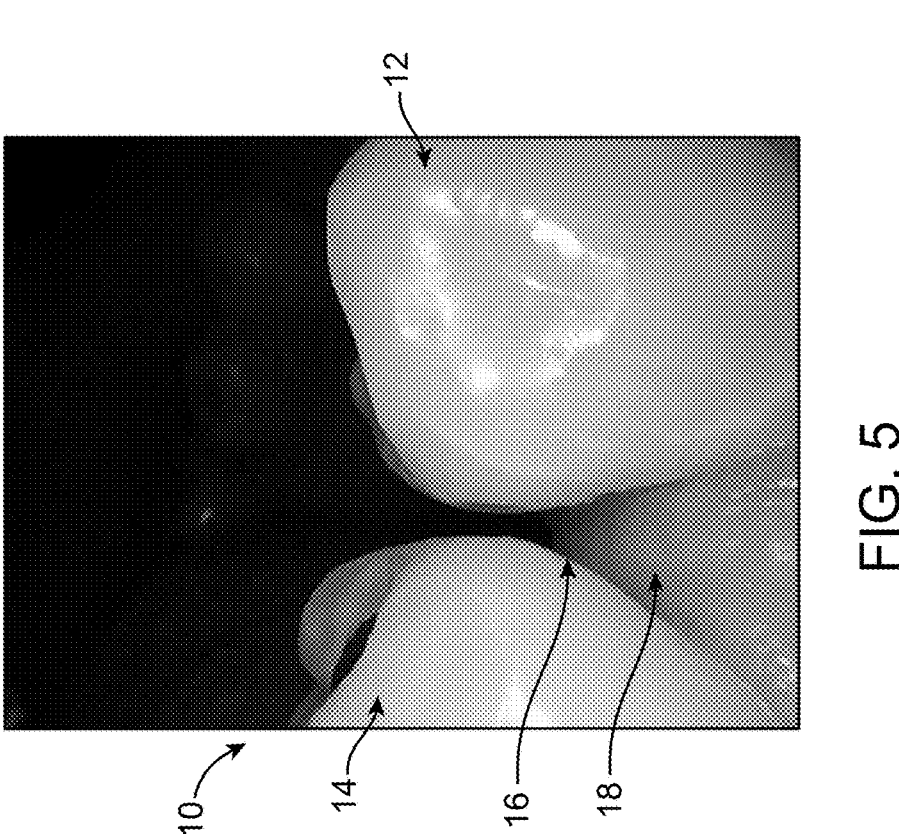
FIG. 5 shows teeth with a diastema prior to placement of an insert and filling material to fill the diastema, in accordance with some embodiments.

FIG. 5 shows teeth 10 with a diastema 16 prior to placement of an insert and curing material to fill the diastema. The first tooth 12 and the second tooth 14 are shown with an inter proximal gap between the first tooth and the second tooth, such that the is a substantial gap between the closest points on the teeth.

Figure 6:
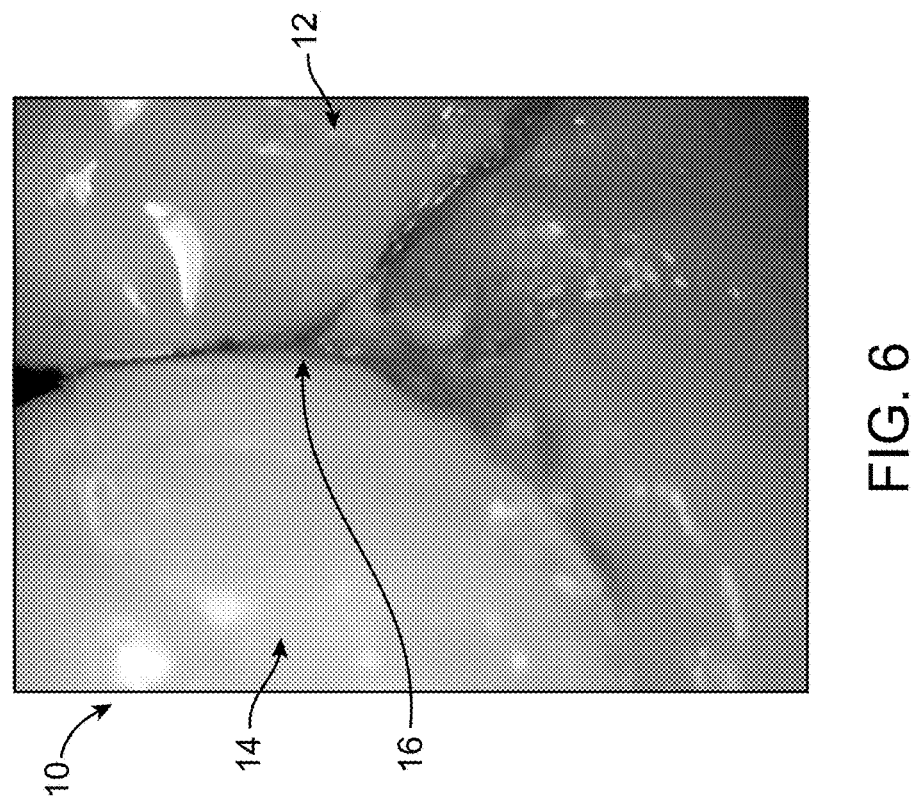
FIG. 6 shows teeth as in FIG. 5 after the filling material has been cured and the insert removed, in accordance with some embodiments.

FIG. 6 shows teeth as in FIG. 5 after the material such as resin has been cured and the insert removed. The gum 16 contacts the cured material on the first tooth 12 and the cured material on the second tooth 14. The diastema is no longer visible, and the teeth appear to contact each other naturally. Although reference is made to a diastema in FIGS. 5 and 6, a black triangle can be treated similarly, for example.

Figure 7:
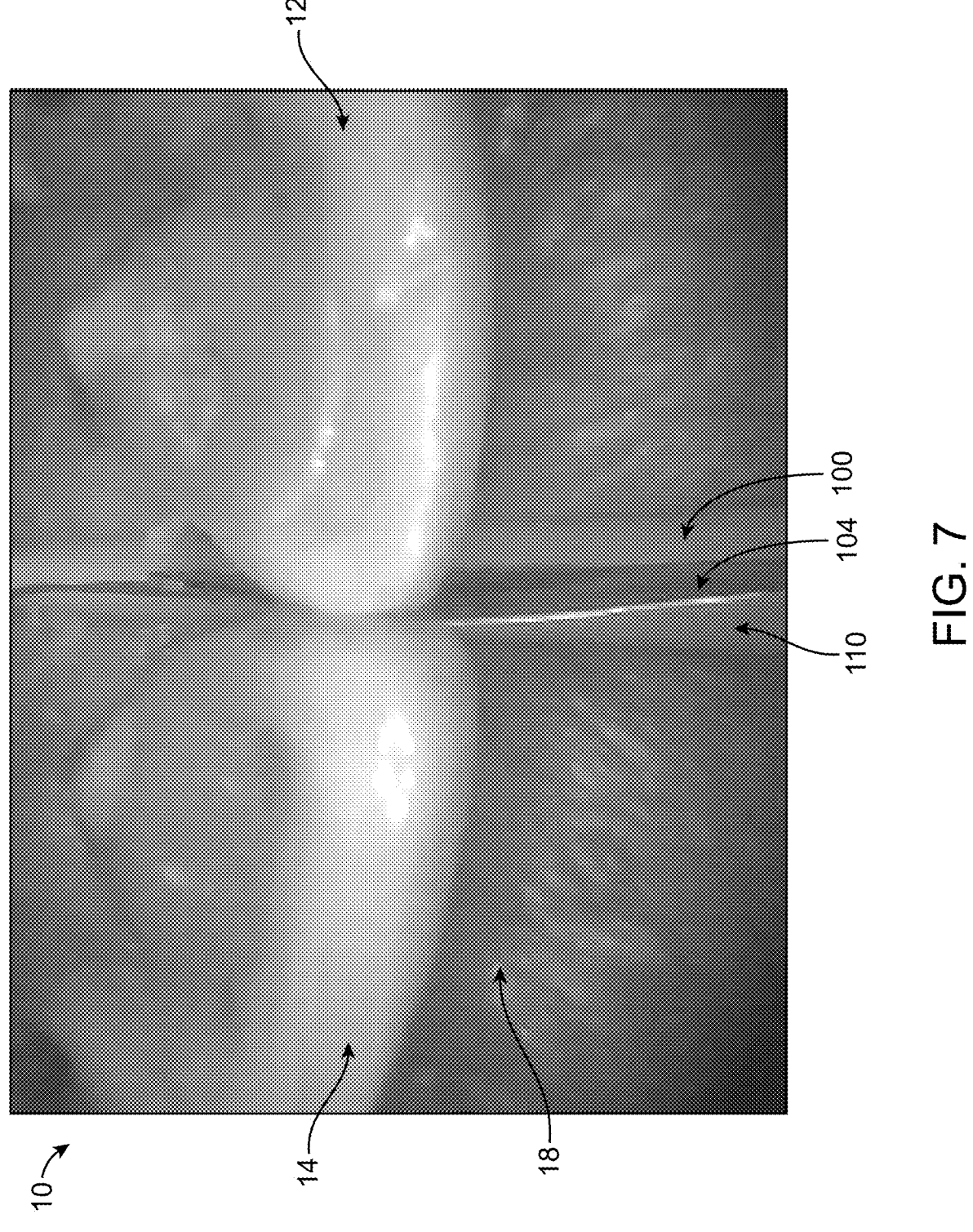
FIG. 7 shows teeth with an insert placed between teeth, in accordance with some embodiments.

FIG. 7 shows teeth with an insert 100 placed between teeth 10. The insert 100 comprises a body 110 and a guide 104 as described herein.

The insert placed between the teeth as described herein may comprise any structures and profiles described herein.

Although reference is made to an insert with one or more structures extending in a longitudinal direction with curvature, in some embodiments, these structures extend in the longitudinal direction without curvature. In some embodiments, the insert comprises one or more structures extending in the longitudinal direction without curvature and these one or more structures extend in the lateral direction with curvature as described herein.

The profiles as described herein and may comprise smooth profiles or stepwise profiles, for example as may occur with additive manufacturing. In some embodiments, the concave profile as described herein comprises a smooth profile. Alternatively or in combination, the concave profile as described herein may comprise a plurality of steps. In some embodiments, the convex profile as described herein comprises a smooth profile. Alternatively or in combination, the convex profile as described herein may comprise a plurality of steps.

In some embodiments, a method of treating a patient is performed with the insert as described herein.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

As used herein, the terms "approximately" and "substantially" refers to a value that is within 25% of the specified value unless indicated otherwise.

As used herein, an occlusal or incisal surface of a tooth encompasses a biting contact surface of any tooth of the mouth, such as an incisor, canine, premolar, or a molar. In some embodiments, the occlusal/incisal direction refers to a direction toward an occlusal surface or an incisal surface of the tooth. In some embodiments, the occlusal/incisal end refers to the occlusal end or the incisal end of the tooth.

In some embodiments, the surfaces of a tooth encompass one or more of the following: an occlusal surface is that surface of a molar or bicuspid that occludes with, or contacts the occlusal surface of a tooth in the opposing arch in a closed bite; a lingual surface is that surface of a tooth that faces the tongue; a facial, or labial surface is that surface of a tooth that faces the lips or face; or the incisal surface of a tooth is that surface of a canine, lateral or central incisor that contact the incisal surface of the tooth in the opposing arch when incising, or biting into food or objects.

The present disclosure includes the following numbered clauses.

1. An insert to place dental fillings on a plurality of teeth of a patient, the insert comprising:
a guide sized and shaped to fit between a first tooth and a second tooth of the plurality of teeth; and
an elongate body extending in a longitudinal direction, the elongate body comprising,
a first curved portion to shape a first filling on the first tooth,
a second curved portion to shape a second filling on the second tooth and
a gum engagement structure sized and shaped to engage with a gum of the patient.
2. The insert of clause 1, wherein the gum engagement structure comprises a longitudinal curvature in a longitudinal direction.
3. The insert of any preceding clause, wherein the gum engagement structure comprises a recess.
4. The insert of any preceding clause, wherein the recess comprises a longitudinal curvature in a longitudinal direction.
5. The insert of any preceding clause, wherein the recess comprises a lateral curvature in a lateral direction.
6. The insert of any preceding clause, wherein the longitudinal body comprises first tooth engagement structure on a first a first side of the guide to engage the first tooth and a second tooth engagement structure on a second side of the guide to engage the second tooth.
7. The insert of any preceding clause, wherein the first tooth engagement structure comprises a first longitudinal curvature in a longitudinal direction and the second tooth engagement structure comprises a second longitudinal curvature in the longitudinal direction.
8. The insert of any preceding clause, wherein the first curved portion comprises a first concave profile in a first lateral direction on a first side of the guide and a second concave portion comprises a second concave profile in a second lateral direction on a second side of the guide.
9. The insert of any preceding clause, wherein the first concave profile extends in the longitudinal direction and the second concave profile extends in the longitudinal direction.
10. The insert of any preceding clause, wherein a first lateral width of the first concave profile increases in a distal to proximal longitudinal direction and a second lateral width of the second concave profile increases in the distal to proximal longitudinal direction.
11. The insert of any preceding clause, wherein the first concave profile comprises a first lateral width at a first longitudinal location and a second lateral width at a second longitudinal location, the first lateral width less than the second lateral width, the first longitudinal location distal to the second longitudinal location.
12. The insert of any preceding clause, wherein the second concave profile comprises a first lateral width at a first longitudinal location and a second lateral width at a second longitudinal location, the first lateral width less than the second lateral width, the first longitudinal location distal to the second longitudinal location.
13. The insert of any preceding clause, wherein a first lateral curvature of the first concave profile decreases in a distal to proximal longitudinal direction and a second lateral curvature of the second concave profile decreases in the distal to proximal longitudinal direction
14. The insert of any preceding clause, wherein the first lateral curvature corresponds to a first radius of curvature and the first radius of curvature increases in a distal to proximal longitudinal direction and the second lateral curvature corresponds to a second radius of curvature and the second radius of curvature decreases in the distal to proximal longitudinal direction.
15. The insert of any preceding clause, wherein the longitudinal body comprises a plurality of projections.
16. The insert of any preceding clause, wherein the plurality of projections comprises a first lateral projection to engage the first tooth and a second lateral projection to engage the second tooth.
17. The insert of any preceding clause, wherein the first lateral projection extends in the longitudinal direction on a first side of the guide and the second lateral projection extends in the longitudinal direction on a second side of the guide.
18. The insert of any preceding clause, wherein the first lateral projection and the second lateral projection extend in a gingival direction.
19. The insert of any preceding clause, wherein the first lateral projection extends in the gingival direction to a first gingival edge and the second lateral projection extends in the gingival direction to a second gingival edge.
20. The insert of any preceding clause, wherein the first gingival edge comprises a first curvature in the longitudinal direction and the second gingival edge comprises a second curvature in the longitudinal direction.
21. The insert of any preceding clause, wherein the first lateral projection extends in the longitudinal direction with a first longitudinal curvature and wherein the second lateral projection extends in the longitudinal direction with a second longitudinal curvature.
22. The insert of any preceding clause, wherein the first longitudinal curvature and the second longitudinal curvature correspond to a radius of curvature.
23. The insert of any preceding clause, wherein the radius of curvature corresponds to a point located beyond the guide in an occlusal/incisal direction.
24. The insert of any preceding clause, wherein the first lateral projection extends in a first lateral direction on a first side of the guide with a first lateral curvature and wherein the second lateral projection extends in a second lateral direction on a second side of the guide with a second lateral curvature.
25. The insert of any preceding clause, wherein a tooth facing portion of the first lateral projection defines a lateral portion of the first portion to shape the first filling.
26. The insert of any preceding clause, wherein the first lateral projection comprises an edge to engage the first tooth.
27. The insert of any preceding clause, wherein first lateral projection comprises a concave portion facing toward the first tooth, the edge lateral to the concave portion.
28. The insert of any preceding clause, wherein the edge comprises a convex portion to engage the tooth.
29. The insert of any preceding clause, wherein a surface of the first lateral projection comprises an inflection located between the concave portion and the convex portion.
30. The insert of any preceding clause, wherein a tooth facing portion of the second lateral projection defines a lateral portion of the second portion to shape the first filling.

31. The insert of any preceding clause, wherein the second lateral projection comprises an edge to engage the second tooth.

32. The insert of any preceding clause, wherein the second lateral projection comprises a concave portion facing toward the second tooth, the edge lateral to the concave portion.

33. The insert of any preceding clause, the edge comprises a convex portion to engage the tooth.

34. The insert of any preceding clause, wherein a surface of the second lateral projection comprises an inflection located between the concave portion and the convex portion.

35. The insert of any preceding clause, wherein the first lateral portion comprises a first edge to engage the first tooth, and the second lateral portion comprises a second edge to engage the second tooth.

36. The insert of any preceding clause, wherein the gum engagement structure comprises a recess shaped to receive the gum of the patient.

37. The insert of any preceding clause, wherein the first lateral projection comprises a first portion of the recess and the second lateral projection comprises a second portion of the recess.

38. The insert of any preceding clause, wherein the first portion of the recess comprises a first convex profile in a lateral direction on a first side of the guide and the second portion of the recess comprises a second convex profile in the lateral direction on a second side of the guide.

39. The insert of any preceding clause, wherein the first convex profile of the recess on the first projection corresponds to a first concave profile on a first tooth facing portion of the first projection to shape the first filling and the second convex profile of the recess on the second projection corresponds to a second concave profile on a second tooth facing portion of the second projection to shape the second filling.

40. The insert of any preceding clause, wherein the first portion of the recess comprises a first concave profile lateral to the first convex profile and the second portion of the recess comprises a second concave profile lateral to the second convex profile.

41. The insert of any preceding clause, wherein a first inflection is located between the first convex profile and the first concave profile, and a second inflection is located between the second convex profile and the second concave profile.

42. The insert of any preceding clause, wherein the first concave profile of the recess is located proximate to a first edge to engage the first tooth and the first concave profile is configured to receive the gum proximate the first edge and wherein the second concave profile of the recess is located proximate to a second edge to engage the second tooth and the second concave profile is configured to receive the gum proximate the second edge.

43. The insert of any preceding clause, wherein the first edge comprises a first convex profile and the second edge comprises a second convex profile.

44. The insert of any preceding clause, wherein the first concave profile is located between the first convex profile and the first convex profile on the first projection and wherein the second concave profile is located between the second convex profile and the second convex profile on the second projection.

45. The insert of any preceding clause, wherein the plurality of projections comprises a third projection extending toward the guide.

46. The insert of any preceding clause, wherein the third projection extends in the longitudinal direction.

46. The insert of any preceding clause, wherein the third projection comprises the guide.

48. The insert of any preceding clause, wherein a first tooth facing portion of the third projection defines a medial portion of the first curved portion to shape the first filling.

49. The insert of any preceding clause, wherein a second tooth facing portion of the third projection defines a medial portion of the second curved portion to shape the second filling.

50. The insert of any preceding clause, wherein a portion of the first projection and a portion of the third projection define a portion of the first curved portion to shape the first filling.

51. The insert of any preceding clause, wherein a portion of the second projection and a portion of the third projection define the second curved portion to shape the second filling.

52. The insert of any preceding clause, wherein the gum engagement structure comprises a recess sized and shaped to receive the gum.

53. The insert of any preceding clause, wherein the recess extends along a portion of the longitudinal body between a distal tip and a proximal handle.

54. The insert of any preceding clause, wherein the recess comprises a varying depth along a midline of the portion of the longitudinal body.

55. The insert of any preceding clause, wherein the portion of the longitudinal body comprises a proximal portion and a distal portion and the depth increases in a proximal to distal direction along the midline of the proximal portion and the depth decreases in the proximal to distal direction along the distal portion.

56. The insert of any preceding clause, wherein the recess comprises a varying width along the portion of the longitudinal body.

57. The insert of any preceding clause, wherein the portion of the longitudinal body comprises a proximal portion and a distal portion and the width increases in a proximal to distal direction along the midline of the proximal portion and the width decreases in the proximal to distal direction along the distal portion.

58. The insert of any preceding clause, wherein the recess comprises a first convex profile in a first lateral direction on a first side of the guide and a second convex profile in a second lateral direction on a second side of the guide.

59. The insert of any preceding clause, wherein the first convex profile corresponds to the first concave portion and the second convex portion corresponds to the second concave portion.

60. The insert of any preceding clause, wherein the first convex profile extends laterally toward a first lateral edge and the second convex profile extends laterally toward a second lateral edge.

61. The insert of any preceding clause, wherein the recess comprises a first concave profile between the first convex portion of the first lateral edge and a second concave profile between the second convex profile and the second lateral edge.

62. The insert of any preceding clause, wherein the first lateral edge comprises a first rounded gingival facing end and the second lateral edge comprises a second rounded gingival facing end.

63. The insert of any preceding clause, wherein the first lateral edge is configured to engage the first tooth and the second lateral edge is configured to engage the second tooth.

64. The insert of any preceding clause, wherein the first lateral edge extends in a first gingival direction to decrease a flow of a filling material and wherein the second lateral edge extends in a second gingival direction to decrease a flow of the filling material.

65. The insert of clause 1, wherein the elongate body comprises a tapered distal tip, wherein the tapered tip is distal to one or more of the guide, the engagement structure, the first curved surface or the second curved surface.

66. The insert of any preceding clause, further comprising a handle.

67. The insert of any preceding clause, wherein the handle comprises a ring.

68. The insert of any preceding clause, wherein a proximal portion of the elongate body comprises a reinforcement structure to couple the elongate body to the handle.

69. The insert of any preceding clause, wherein the reinforcement structure comprises a triangular cross-sectional shape profile proximate the handle, a first side of the triangular shape profile corresponding to the first curved portion, a second side of the triangular shape profile corresponding to the second curved portion, a third side of the triangular shape profile corresponding to the gum engagement portion.

70. The insert of any preceding clause, wherein the reinforcement structure comprises a shape profile, the shape profile varying in the longitudinal direction between the handle and the first curved portion, the second curved portion and the gum engagement structure.

71. The insert of any preceding clause, wherein the shape profile transitions from the shape profile of the distal portion of the handle to the shape profile of the first curved portion, the shape profile of the second curved portion and the shape profile of the gum engagement structure.

72. The insert of any preceding clause, wherein the guide extends from the elongate body.

73. The insert of any preceding clause, wherein the guide extends from the elongate body in an occlusal/incisal direction.

74. The insert of any preceding clause, wherein the guide is located along a midline of the elongate body.

75. The insert of any preceding clause, wherein the guide comprises a proximally inclined distal end.

76. The insert of any preceding clause, wherein the guide comprises a substantially uniform thickness and optionally wherein the thickness is uniform to within 10 percent.

77. The insert of any preceding clause, wherein the guide comprises a thickness sized to contact the first tooth on a first side of the guide and the second tooth on the second side of the guide.

78. The insert of any preceding clause, wherein the thickness is sized to fit between one or more of a contact point between the first tooth and the second tooth, an interproximal space between the first tooth and the second tooth, or a location on the first tooth closest to a location of the second tooth.

79. The insert of any preceding clause, wherein the guide comprises a thickness within a range from about 0.001" to about 0.003".

80. The insert of any preceding clause, wherein the guide comprises a metal.

81. The insert of any preceding clause, wherein the metal comprises steel.

82. The insert of any preceding clause, wherein the elongate body comprises plastic.

83. The insert of any preceding clause, wherein the guide comprises plastic.

84. The insert of any preceding clause, wherein the elongate body comprises a first component and the guide comprises a second component.

85. The insert of any preceding clause, wherein the elongate body comprises a slot sized to receive the guide to assemble the insert.

86. A method of treating a patient, the method comprising: placing an insert between a first tooth and a second tooth, the insert comprising the insert of any of the preceding clauses.

87. The method of clause 86, wherein the patient is treated for one or more of a black triangle or a diastema.

88. The method of clause 86, wherein a curable material is placed on each of the first tooth and the second tooth while the insert remains between the first tooth and the second tooth.

89. The method of clause 86, wherein the insert shapes a material and wherein a gum of the patient contacts the material on the first tooth and the second tooth when the material has been cured and the insert has been removed.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. An insert to place dental fillings on a plurality of teeth of a patient, the insert comprising:

a guide sized and shaped to fit between a first tooth and a second tooth of the plurality of teeth; and an elongate body extending in a longitudinal direction, the elongate body comprising, a first projection on a first side of the guide, the first projection extending to a first convex edge, the first projection comprising a first concavely curved portion to shape a first filling on the first tooth with a first inflection located between the first concavely curved portion and the first convex edge, a second projection on a second side of the guide, the second projection extending to a second convex edge, the second projection comprising a second concavely curved portion to shape a second filling on the second tooth with a second inflection located between the second concavely curved portion and the second convex edge, and a gum engagement structure sized and shaped to engage with a gum of the patient, the gum engagement structure located on gum a facing side of the first projection and a gum facing side of the second projection, the gum facing side of the first projection comprising a first laterally curved convex portion and a first laterally curved concave recess, the first laterally curved concave recess located between the first laterally curved convex portion and the first edge, the gum facing side of the second projection comprising a second laterally curved convex portion and a second laterally curved concave recess, the second laterally curved concave recess located between the second laterally curved convex portion and the second edge.

2. The insert of claim 1, wherein the gum engagement structure comprises a longitudinal curvature in a longitudinal direction.

3. The insert of claim 1, wherein the recess comprises a longitudinal curvature in a longitudinal direction.

4. The insert of claim 1, wherein the elongate body comprises first tooth engagement structure on the first projection on the first of the guide to engage the first tooth with the first convex edge and a second tooth engagement structure on the second projection on the second side of the guide to engage the second tooth with the second convex edge.

5. The insert of claim 4, wherein the first tooth engagement structure comprises a first longitudinal curvature in the longitudinal direction and the second tooth engagement structure comprises a second longitudinal curvature in the longitudinal direction.

6. The insert of claim 1, wherein the first concavely curved portion comprises a first concave profile in a first lateral direction on the first side of the guide and the second concavely curved portion comprises a second concave profile in a second lateral direction on the second side of the guide.

7. The insert of claim 6, wherein the first concave profile extends in the longitudinal direction and the second concave profile extends in the longitudinal direction.

8. The insert of claim 7, wherein a first lateral width of the first concave profile increases in a distal to proximal longitudinal direction and a second lateral width of the second concave profile increases in the distal to proximal longitudinal direction.

9. The insert of claim 7, wherein the first concave profile comprises a first lateral width at a first longitudinal location and a second lateral width at a second longitudinal location, the first lateral width less than the second lateral width, the first longitudinal location distal to the second longitudinal location.

10. The insert of claim 7, wherein the second concave profile comprises a first lateral width at a first longitudinal location and a second lateral width at a second longitudinal location, the first lateral width less than the second lateral width, the first longitudinal location distal to the second longitudinal location.

11. The insert of claim 7, wherein a first lateral curvature of the first concave profile decreases in a distal to proximal longitudinal direction and a second lateral curvature of the second concave profile decreases in the distal to proximal longitudinal direction.

12. The insert of claim 11, wherein the first lateral curvature corresponds to a first radius of curvature and the first radius of curvature increases in a distal to proximal longitudinal direction and the second lateral curvature corresponds to a second radius of curvature and the second radius of curvature decreases in the distal to proximal longitudinal direction.

13. The insert of claim 1, wherein the first projection extends in the longitudinal direction on the first side of the guide and the second projection extends in the longitudinal direction on the second side of the guide.

14. The insert of claim 13, wherein the first projection and the second projection extend in a gingival direction.

15. The insert of claim 14, wherein the first projection extends in the gingival direction to the first convex edge and the second projection extends in the gingival direction to the second convex edge.

16. The insert of claim 15, wherein the first convex edge comprises a first curvature in the longitudinal direction and the second convex edge comprises a second curvature in the longitudinal direction.

17. The insert of claim 1, wherein the elongate body comprises structural resistance to distortion when wedged between the plurality of teeth.

* * * * *